United States Patent [19]
Itoi et al.

[11] Patent Number: 5,556,072
[45] Date of Patent: Sep. 17, 1996

[54] CONTROLLER

[75] Inventors: Shigeru Itoi; Kenji Yamamoto, both of Osaka, Japan

[73] Assignee: Fujikin Incorporated, Osaka, Japan

[21] Appl. No.: 334,384

[22] Filed: Nov. 3, 1994

[30] Foreign Application Priority Data

Nov. 12, 1993 [JP] Japan .................. 5-283327

[51] Int. Cl.$^6$ .................................................. F16K 31/12
[52] U.S. Cl. .................................. 251/58; 251/280
[58] Field of Search ........................ 251/280, 58

[56] References Cited

U.S. PATENT DOCUMENTS

| | | | |
|---|---|---|---|
| 2,395,223 | 2/1946 | Ingres | 60/54.6 |
| 2,539,913 | 6/1948 | Koepcke | 74/110 |
| 3,610,568 | 10/1971 | Duwe | 251/58 |
| 3,737,142 | 6/1973 | Boswell et al. | 251/58 |
| 3,985,151 | 10/1976 | Smith | 251/58 |
| 4,270,398 | 6/1981 | Arnold | 74/110 |
| 4,278,234 | 7/1981 | Baumann | 251/57 |
| 4,549,719 | 10/1985 | Baumann | 251/280 |
| 4,609,178 | 9/1986 | Baumann | 251/229 |
| 4,684,103 | 8/1987 | Baumann | 251/280 |
| 4,729,544 | 3/1988 | Baumann | 251/129.5 |
| 4,791,856 | 12/1988 | Heim et al. | 92/84 |
| 4,871,143 | 10/1989 | Baker | 251/58 |
| 4,875,404 | 10/1989 | Aldridge | 92/130 |
| 4,925,154 | 5/1990 | Baker | 251/58 |
| 5,108,069 | 4/1992 | Tada | 251/58 |
| 5,215,286 | 6/1993 | Kolenc | 251/58 |

OTHER PUBLICATIONS

Ser. No. 08/434,404 Itoi, et al. filing date May 03, 1995.

Primary Examiner—A. Michael Chambers
Attorney, Agent, or Firm—Armstrong, Westerman, Hattori, McLeland & Naughton

[57] ABSTRACT

A controller comprises a valve body having a valve element and a valve seat defining therebetween a fluid channel openable and closable with reciprocating upward and downward movement of a valve stem, a casing fixed to an upper portion of the valve body, an operating rod provided in an upper inside portion of the casing and movable upward and downward, a drive device for moving the operating rod upward and downward, and a force transmission device provided in a lower inside portion of the casing for transmitting force acting on the operating rod to the valve stem. The transmission device comprises a conical first roller contact member extending vertically downward from a lower end of the operating rod, a second roller contact member provided at the valve stem upper end, a pair of roller support members arranged between the two contact members symmetrically with respect to the first contact member axis, a pair of rollable rollers rotatably supported by the support member at an upper portion thereof and bearing on a tapered face of the first contact member, and a pair of push rollers rotatably supported by a lower portion of the support member and bearing on a roller support upper surface of the second contact member. Each of the roller support members is supported by the casing so as to be pivotally movable about an axis on the side of the first contact member axis relative to the corresponding push roller axis.

4 Claims, 4 Drawing Sheets

CONTROLLER

BACKGROUND OF THE INVENTION

The present invention relates to controllers for opening and closing a fluid channel.

Controllers are already known which include those adapted to close a fluid channel by a valve stem biased downward by a spring and to open the fluid channel by driving the valve stem upward with a force of pneumatic pressure, solenoid, or the like, which is greater than the force of the spring, and those adapted to open a fluid channel by a valve stem biased upward with a spring and to close the fluid channel by urging the valve stem downward with a force of pneumatic pressure, solenoid, or the like, which is greater than the force of the spring.

In the case where such conventional controllers are used for high-pressure fluids, there arises a need to use an increased force for closing the fluid channel to prevent leakage of the fluid. However, the controller wherein the valve stem is biased downward by a spring to close the fluid channel and driven upward by pneumatic pressure, solenoid, or the like, to open the fluid channel has the problem that the channel closing force cannot be increased, as required, because an increase in the force of the spring necessitates an increase in the pneumatic, or like force for driving the valve stem but the increase in the driving force, is limited. The controller wherein the valve stem is biased upward by a spring to open the fluid channel and urged downward with a force of pneumatic pressure, solenoid, or the like, which is greater than the spring force to close the fluid channel has a similar problem since an increase in the channel closing force requires an increase in the pneumatic, or the like, downward urging force.

SUMMARY OF THE INVENTION

An object of the present invention is to provide a controller wherein the fluid channel closing force can be increased, as required, without increasing pneumatic pressure, elastic force of spring or drive force of solenoid, or the like, and which is therefore usable for high-pressure fluids with leakage of the fluid prevented reliably.

The terms "upward" and "downward" are herein used with reference to the state of the present device in use as shown in FIG. 1.

The controller embodying the present invention comprises a valve body having a valve element and a valve seat defining therebetween a fluid channel openable and closable with reciprocating upward and downward movement of a valve stem, a casing fixed to an upper portion of the valve body, an operating rod provided in an upper inside portion of the casing and movable upward and downward, drive means for moving the operating rod upward and downward, and force transmission means provided in a lower inside portion of the casing for transmitting a force acting on the operating rod to the valve stem, the force transmission means comprising a conical first roller contact member extending vertically downward from a lower end of the operating rod, a second roller contact member provided at an upper end of the valve stem, a pair of roller support members arranged between the two roller contact members symmetrically with respect to the axis of the first roller contact member, a pair of rollable rollers each rotatably supported by the roller support member at an upper portion thereof and in bearing contact with a tapered face of the first roller contact member, and a pair of push rollers each rotatably supported by the roller support member at a lower portion thereof and in bearing contact with an upwardly facing roller support surface of the second roller contact member, each of the roller support members being supported by the casing so as to be pivotally movable about an axis on the side of the axis of the first roller contact member relative to the axis of the corresponding push roller.

With reference to FIG. 4 showing the above arrangement, suppose a force F acts on the operating rod 21, and the half angle of a tapered face 26a of the conical first roller contact member 26 is $\alpha$. The force G then acting on each of the rollable rollers 46 perpendicular to the tapered face 26a is given by the equation $G=F\div 2 \sin \alpha$.

The force G acting on the rollable roller 46 is transmitted to the roller contact member 19 via the roller support member 43 and push roller 45.

Suppose the distance between the central axis 74 of pivotal movement of the roller support member 43 and the axis 75 of the rollable roller 46 is C, the angle a line through the central axis 74 of pivotal movement of the member 43 and through the axis 75 of the rollable roller 46 makes with the tapered face 26a of the first roller contact member 26 is $\gamma$, the horizontal distance from the central axis 74 to the axis 76 of the corresponding push roller 45 is $\sigma$, and the downward pushing force exerted by the push roller 45 on the roller contact member 19 is N. The arrangement then has the relationship of $N\times\sigma=G\times\cos\gamma\times C$. Accordingly, the downward force with which the two push rollers 45 push the roller contact member 19, i.e., the downward pushing force on the valve stem 2, is given by $2N =F\times\cos\gamma\times C\div\sin\alpha\div\sigma$. Thus, the force acting on the operating rod 21 can be transmitted as amplified at a desired ratio to the valve stem 2 by adjusting $\alpha$, $\gamma$ and $\sigma$ to suitable values. This makes it possible to increase the fluid channel closing force as required without increasing the air pressure, spring force or force of a solenoid, or the like, for opening the fluid channel, whereby leakage of the fluid can be prevented reliably even when the fluid has a high pressure.

With an embodiment of the invention, the casing has a cylinder chamber in its upper portion, and the drive means has a piston fixed to the operating rod and slidable upward and downward in the cylinder chamber, a spring biasing the piston at all times and a compressed air inlet passage for introducing compressed air into the cylinder chamber therethrough.

According to the embodiment, each of the push rollers is rotatably supported by a shaft, which is provided at each of its opposite ends with an eccentric pivot integral therewith, and the roller support member is pivotally movable about the axis of the eccentric pivot. The horizontal distance between the central axis of pivotal movement of the roller support member and the axis of the push roller can then be made accurate to give an accurate amplification ratio.

Further according to the embodiment, the casing of the controller is fixedly provided in its lower inside portion with a pair of vertical members each having a bearing for rotatably supporting the eccentric pivot. The roller support members can then be retained by the pair of vertical members. This renders the force transmission means easy to assemble.

According to the embodiment, each of the roller support members comprises a pair of vertical plates, and each end of the push roller shaft is formed with a fitting portion having a noncircular cross section, each of the vertical plates being formed with a noncircular opening for the fitting portion to fit in. The push roller can then be incorporated into the roller support member easily.

DESDESCRIPTION OF THE PREFERRED EMBODIMENT

Figure 1:
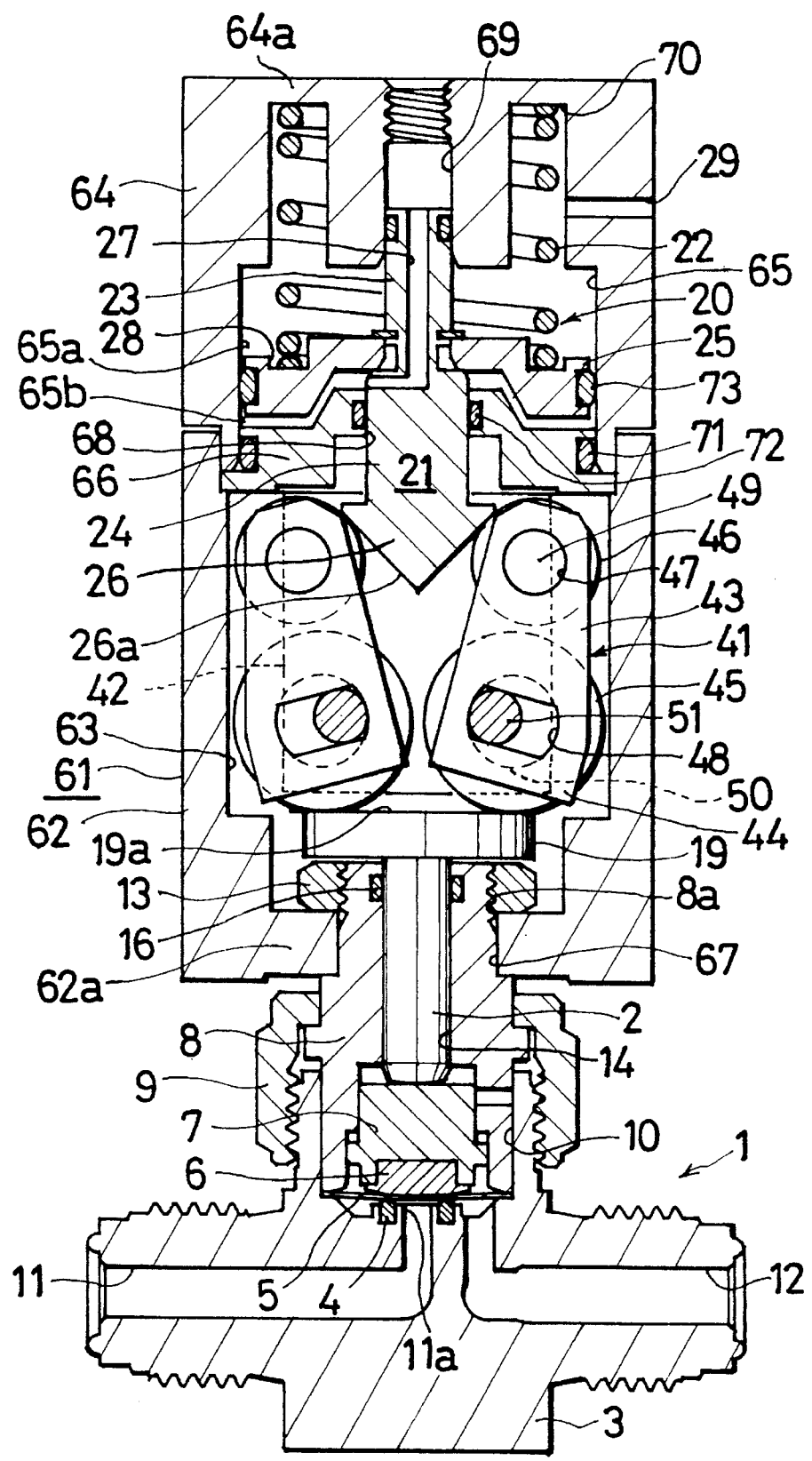
FIG. 1 is a view in vertical section showing a controller embodying the invention in a closed state.
Figure 2:
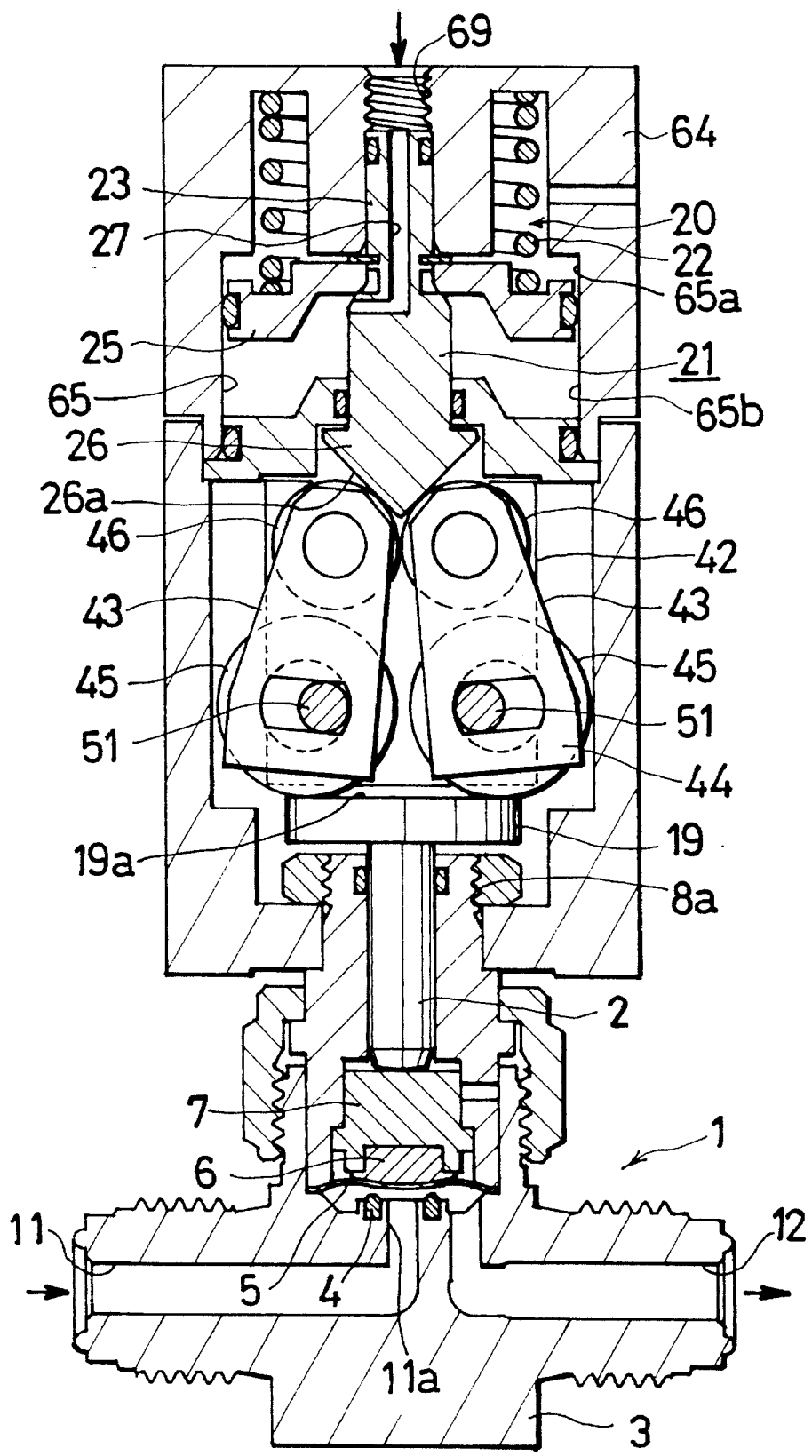
FIG. 2 is a view in vertical section showing the same in an open state.
Figure 3:
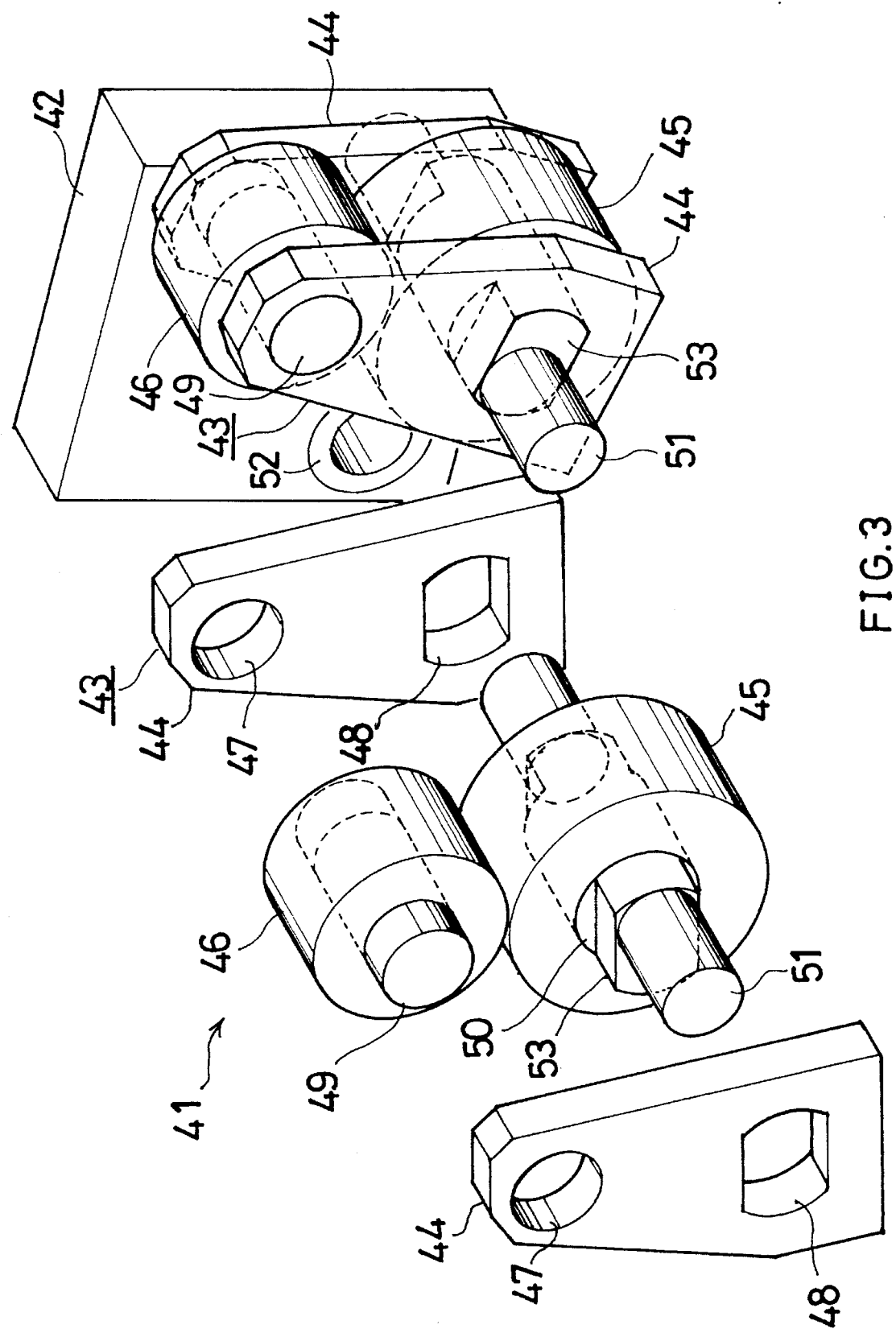
FIG. 3 is an exploded perspective view showing a force transmission device of the controller of the invention.
Figure 4:
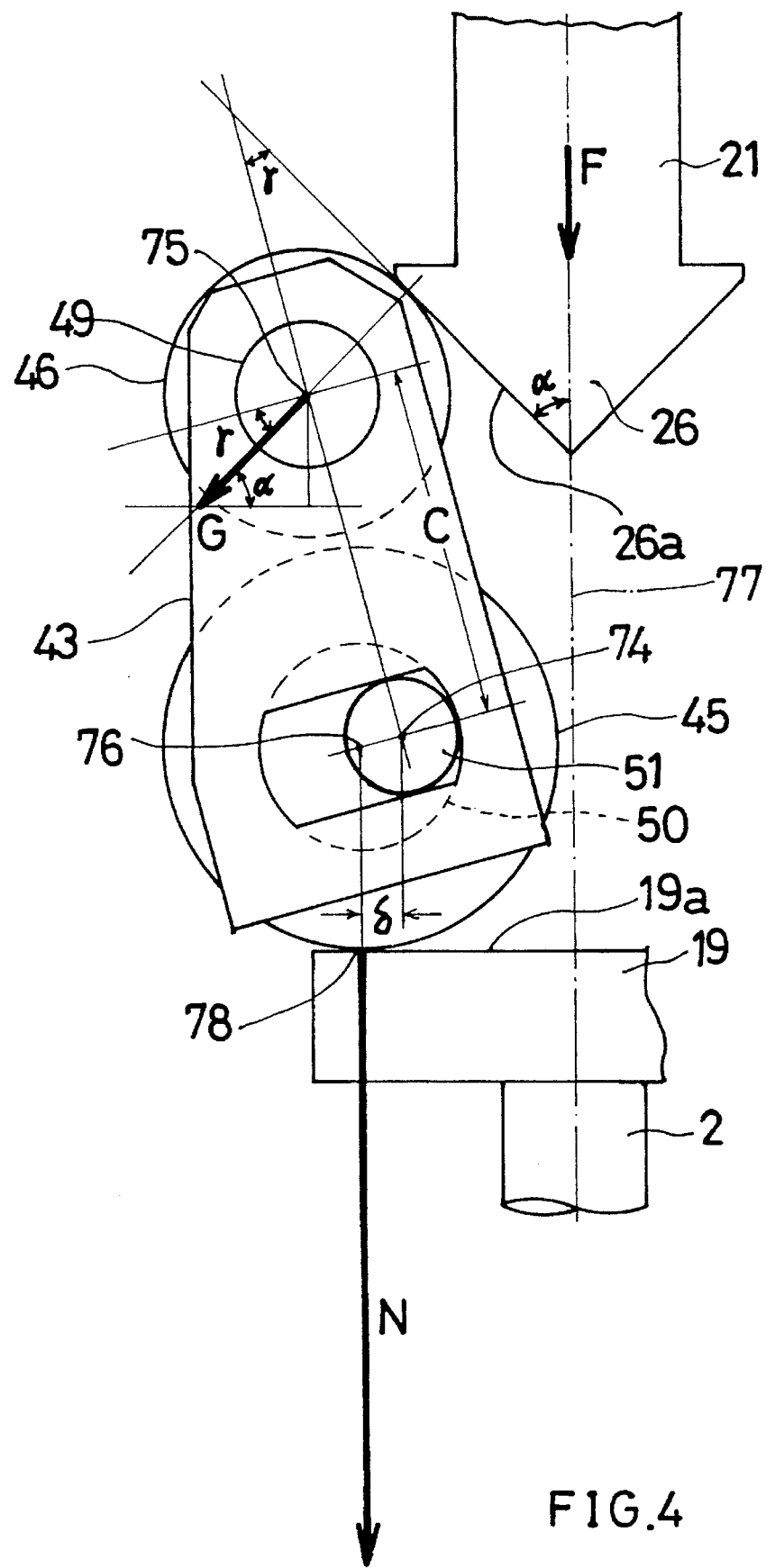
FIG. 4 is an enlarged fragmentary diagram illustrating the principle on which the force acting on an operating rod is transmitted as amplified by the transmission device to a vlave stem.

An embodiment of the invention will be described below with reference to the drawings. In the following description, the term "front" refers to the left-hand side of FIG. 1, the term "rear" to the right-hand side of the drawing, and the terms "right" and "left" are used for the embodiment as viewed from the rear toward the front.

With reference to FIGS. 1 to 4, the illustrated controller comprises a valve body 1, a casing 61 fixed to the upper portion of the valve body 1, an operating rod 21 provided in the upper inside portion of the casing 61 and movable upward and downward, a drive device 20 for moving the operating rod 21 upward and downward, and a force transmission device 41 provided in the lower inside portion of the casing 61 for transmitting a force acting on the operating rod 21 to a valve stem 2.

The valve body 1 comprises a valve case 3 which is formed with a cavity 10 opened upward, a fluid inlet channel 11 having a forwardly open end and another open end in communication with the central portion of bottom of the cavity 10, and a fluid outlet channel 12 having a rearwardly open end and another open end in communication with the rear portion of bottom of the cavity 10. The valve body 1 further comprises an annular valve seat 4 provided on the peripheral edge of the open rear end 11a of the inlet channel 11, a diaphragm (valve element) 5, a diaphragm holder 6, a disk 7 having the diaphragm holder 6 attached to its lower end, the valve stem 2 for moving the disk 7 upward and downward, and a bonnet 8 having a stem guide bore 14 and fastened to the valve case 3 with a nut 9. The valve element 5 and the valve seat 4 define therebetween a fluid channel 11a, which is opened and closed with reciprocating upward and downward movement of the valve stem 2. An O-ring 16 is provided between the outer periphery of the valve stem 2 and the bonnet wall defining the stem guide bore 14.

The casing 61 comprises a hollow lower casing member 62 which is open upward, and a hollow upper casing member 64 which is open downward. A partition plate 66 is secured to the inner periphery of the casing portion where the lower end of the upper casing member 64 butts on the upper end of the lower casing member 62. The casing 61 is internally formed with a cylinder chamber 65 of circular horizontal section and a force transmission chamber 63 of square or rectangular horizontal section above and below the partition plate 66, respectively. An O-ring 71 is provided between the outer periphery of the partition plate 66 and the inner periphery of lower end of the upper casing member 64. The upper casing member 64 has a top wall 64a which is centrally formed with a through bore 69 for admitting compressed air and also for guiding the operating rod 21. An operating rod hole 68 is formed in the partition plate 66 centrally thereof. The lower casing member 62 has a bottom wall 62a which is centrally formed with a bonnet hole 67. The upper end of the bonnet 8 is inserted through the hole 67. The upper end of the bonnet 8 has an externally threaded portion 8a, on which a lock nut 13 is screwed to thereby fix the valve body 1 to the lower casing member 62.

The operating rod 21 comprises a small-diameter portion 23 having its upper end inserted in the through bore 69 of the upper casing member 64, and a large-diameter portion 24 extending downward from the portion 23, inserted through the rod hole 68 of the partition plate 66 and further extending downward. A piston 25 slidable upward and downward in the cylinder chamber 65 is provided around the lower end of small-diameter portion 23 of the operating rod 21. The cylinder chamber 65 is divided by the piston 25 into an upper cylinder chamber 65a and a lower cylinder chamber 65b. An O-ring 72 is provided inside the rod hole 68 around the large-diameter portion 24 of the operating rod 21. An O-ring 73 is interposed between the outer periphery of the piston 25 and the inner periphery of the upper casing member 64.

Annular spring retaining recesses 28, 70 are formed respectively in the upper surface of piston 25 of the operating rod 21 and in the lower surface of top wall 64a of the upper casing member 64. A spring 22 for biasing the piston 25 downward is fitted in and held by these retaining recesses 28, 70. The small-diameter portion 23 of the operating rod 21 has a compressed air inlet passage 27 communicating at its one end with the through bore 69 of the upper casing member 64 and at the other end thereof with the lower cylinder chamber 65b. The peripheral wall of the upper casing member 64 is formed with an air outlet passage 29 for releasing air from inside the upper cylinder chamber 65a therethrough when the piston 25 moves upward.

The drive device 20 for moving the operating rod 21 upward and downward consists primarily of the piston 25, spring 22, cylinder chamber 65 and air inlet passage 27. The piston 25 is biased downward by the spring 22 at all times and is driven upward with compressed air introduced into the cylinder chamber 65 via the inlet passage 27. The force acting on the piston 25 is transmitted to the operating rod 21 to drive the rod 21 upward or downward.

The force transmission device 41 comprises a conical first roller contact member 26 integral with the lower end of large-diameter portion 24 of the operating rod 21 and extending therefrom vertically downward, a second roller contact member 19 integral with the upper end of the valve stem 2, a pair of front and rear roller support members 43 arranged between the two roller contact members 26, 19 symmetrically with respect to the axis of the first roller contact member 26, a pair of front and rear rollable rollers 46 each rotatably supported by the upper portion of the roller support member 43 and in bearing contact with a tapered face 26a of the first roller contact member 25, and a pair of front and rear push rollers 45 each rotatably supported by the lower portion of the roller support member 43 and in bearing contact with an upwardly facing roller support surface 19a of the second roller contact member 19.

The first roller contact member 26 has a bottom diameter larger than the diameter of the large-diameter portion 24 and extends into the transmission chamber 63. The second roller contact member 19 is in the form of a disk and is positioned above the bonnet 8 inside the casing 61.

The front and rear roller support members 43 each comprise a pair of right and left vertical plates 44 for holding the rollable roller 46 and the push roller 45 therebetween. Each of the vertical plates 44 has a circular shaft hole 47 at its upper end portion and a noncircular shaft hole 48 at its lower end portion.

Each of the front and rear rollable rollers 46 is rotatably fitted around a horizontal shaft 49 extending transversely of the controller and having each of its right and left ends fixedly fitted in the shaft hole 47. Thus, the rollable roller 46 is supported by the corresponding support member 43 rotatably about the horizontal shaft.

Each of the front and rear push rollers 45 is rotatably fitted around a horizontal shaft 50 extending transversely of the controller. Each of the right and left ends of the roller shaft 50 is cut away at its upper and lower sides to provide a fitting portion 53 of noncircular cross section. The shaft hole 48 is shaped in conformity with the cross sectional shape of the fitting portion 53. The fitting portion 53 is fitted in the shaft hole 48, whereby the push roller 45 is supported by the corresponding support member 43 rotatably about the transverse horizontal shaft.

The shaft 50 of each push roller 45 further has an eccentric pivot 51 which is integral with each of its opposite ends and about which the roller support member 43 is pivotally movable. The axis 74 of the eccentric pivot 51, i.e., the central axis of pivotal movement, is positioned on the side of the axis 77 of the first roller contact member 26 relative to the axis 76 of the push roller 45.

Right and left retainers 42 each in the form of a vertical rectangular plate are arranged so as to hold the front and rear support members 43 therebetween, and are secured to the respective right and left side walls of the lower casing member 42 inside thereof.

The outer end of each eccentric pivot 51 is rotatably fitted in a bearing 52 provided on the corresponding retainer 42, whereby the eccentric pivot 51 is rotatably supported by the lower casing member 62 so as to be immovable forward or rearward, upward or downward, and rightward or leftward, rendering the support member 43 pivotally movable about the axis 74 of the eccentric pivot 51.

When the roller support member 43 is pivotally moved, the axis 76 of the push roller 45 revolves about the axis 74 of the eccentric pivot 51, thereby altering the distance from the axis 76 of the push roller 45 to the point 78 of contact between the push roller 45 and the second roller contact member 19 to vary the pushing force exerted by the push roller 45 on the second roller contact member 19.

When the fluid channel is in the closed state shown in FIG. 1, the operating rod 21 is held in a lowered position by being biased downward by the force of the spring 22, with the front and rear rollable rollers 46 positioned away from each other and with the front and rear push rollers 45 positioned closer to each other. The elastic force of the spring 22 is delivered through the rollable rollers 46, support members 43 and push rollers 45 to the second roller contact member 19, pushing the valve stem 2 downward. This force is transmitted to the diaphragm 5 to hold the open rear end 11a of the fluid inlet channel 11 closed.

The force exerted on the second roller contact member 19 can be made greater than the elastic force of the spring 22 by adjusting the taper angle of the tapered face 26a of the first roller contact member 26, the distance between the axis 74 of the eccentric pivot 51 and the axis 75 of the rollable roller shaft 49 and the horizontal distance between the axis 76 of the push roller shaft 50 and the axis 74 of the eccentric pivot 51 to suitable values. This principle will be described with reference to FIG. 4.

Suppose the elastic force of the spring 22 acting on the operating rod 21 is F, and the half angle of the tapered face 26a of the first roller contact member 26 is $\alpha$. A force then acts on the rollable rollers 46 perpendicular to the tapered face 26a. This force, G, acting on each rollable roller 46 is given by the equation $G = F \div 2\sin\alpha$.

The force G acting on the rollable roller 46 is transmitted to the second roller contact member 19 via the roller support member 43 and push roller 45.

Suppose the distance between the axis 74 of the eccentric pivot 51 and the axis 75 of the rollable roller shaft 49 is C, the angle a line through the axis 75 of the rollable roller shaft 49 and through the axis 74 of the eccentric pivot 51 makes with the tapered face 26a of the first roller contact member 26 is $\gamma$, the horizontal distance from the axis 76 of the push roller shaft 50 to the axis 74 of the eccentric pivot 51 is $\sigma$, and the downward pushing force exerted by one of the front and rear push rollers 45 on the second roller contact member 19 is N. The arrangement then has the relationship of $N \times \sigma = G \times \cos\gamma \times C$. Accordingly, the downward force with which the two front and rear push rollers 45 push the second roller contact member 19, i.e., the downward pushing force on the valve stem 2 is given by $2N = F \times \cos\gamma \times C \div \sin\alpha \div \sigma$. Thus, the force acting on the operating rod 21 can be transmitted, as amplified at a desired ratio, to the valve stem 2 by determining suitable values for $\alpha$, $\gamma$ and $\sigma$.

With the present embodiment, $\alpha=40°$, $\gamma=25°$, $C=12.5$, $\sigma=1.5$, and the amplification ratio is about 12 times.

When compressed air is sent into the upper casing member 64 through the through bore 69 thereof, the air is supplied to the cylinder chamber 65 from the lower portion thereof via the air inlet passage 27 of the small-diameter portion 23 of the operating rod 21. Consequently, an upward force acts pneumatically on the piston 25. When made greater than the downward force of the spring 22, this force drives the operating rod 21 upward. This movement moves the front and rear rollable rollers 46 toward each other, pivotally moves the front and rear roller support members 43 and moves the front and rear push rollers 45 away from each other. Accordingly, the distance from the axis of each push roller 45 to the point 78 of contact of the push roller 45 with the second roller contact member 19 decreases to eliminate the downward pushing force exerted by the push roller 45 on the valve stem 2, whereupon the diaphragm 5 is pushed up by fluid pressure to open the fluid channel 11a (see FIG. 2).

The controller operates satisfactorily when the air pressure required to open the fluid channel 11a is slightly greater than the elastic force of the spring 22. Since the elastic force of the spring 22 can be made small based on the principle of amplification illustrated in FIG. 4, the air pressure necessary for opening the fluid channel 11a can be small.

Although the operating rod 21 is driven by air pressure when opening the fluid channel 11a with the foregoing embodiment, the rod 21 can be driven alternatively, for example, by a solenoid in place of air pressure. It is also possible to hold the fluid channel closed by a valve stem which is urged downward with air pressure or force of a solenoid or the like which is greater than the force of a spring biasing an operating rod upward and to open the fluid channel by removing the air pressure or force of the solenoid or the like.

What is claimed is:

1. A controller comprising a valve body having a valve element and a valve seat defining therebetween a fluid channel openable and closable with reciprocating upward and downward movement of a valve stem, a casing fixed to an upper portion of the valve body, an operating rod provided in an upper inside portion of the casing and movable upward and downward, drive means for moving the operating rod upward and downward, and force transmission means provided in a lower inside portion of the casing for transmitting a force acting on the operating rod to the valve stem, the force transmission means comprising a first roller contact member having a conical surface extending vertically downward from a lower end of the operating rod, a second roller contact member provided at an upper end of the valve stem, a pair of opposed roller support members arranged between the two roller contact members symmetrically with respect to the axis of the first roller contact member, a pair of rollable rollers each being rotatably supported by each of the roller support members at an upper portion thereof and in bearing contact with a conically tapered face of the first roller contact member, and a pair of push rollers each being rotatably supported by a push roller shaft engaging each of the roller support members at a lower portion thereof and being in bearing contact with an upwardly facing roller support surface of the second roller contact member, said push roller shaft being provided at each of its opposite ends with an eccentric pivot integral therewith and received in said roller support members so as to render said roller support members pivotally movable about an axis perpendicular to and laterally spaced from the axis of the first roller contact member.

2. A controller as defined in claim 1 wherein the casing has a cylinder chamber in its upper portion, and the drive means has a piston fixed to the operating rod and slidable upward and downward in the cylinder chamber, a spring biasing the piston at all times and a compressed air inlet passage for introducing compressed air into the cylinder chamber therethrough.

3. A controller as defined in claim 1 wherein the casing is fixedly provided in its lower inside portion with a pair of vertical members each having a bearing for rotatably supporting the eccentric pivot.

4. A controller as defined in claim 1 wherein each of the roller support members comprises a pair of vertical plates, and each end of the push roller shaft is formed with a fitting portion having a noncircular cross section, each of the vertical plates being formed with a noncircular opening for receiving the fitting portion.

* * * * *